United States Patent
Lundqvist

(10) Patent No.: US 6,559,453 B2
(45) Date of Patent: May 6, 2003

(54) METHOD AND ARRANGEMENT RELATING TO X-RAY IMAGING

(75) Inventor: Mats Lundqvist, Täby (SE)

(73) Assignee: Mamea Imaging AB, Täby (SE)

( * ) Notice: Subject to any disclaimer, the term of this patent is extended or adjusted under 35 U.S.C. 154(b) by 0 days.

(21) Appl. No.: 10/063,286

(22) Filed: Apr. 8, 2002

(65) Prior Publication Data

US 2002/0179844 A1 Dec. 5, 2002

Related U.S. Application Data

(63) Continuation of application No. PCT/SE00/01954, filed on Oct. 9, 2000.
(60) Provisional application No. 60/158,465, filed on Oct. 8, 1999.

(51) Int. Cl.$^7$ ................................................. G01T 1/24
(52) U.S. Cl. .................................. 250/371; 250/370.01
(58) Field of Search .......................... 250/371, 370.01, 250/370.09, 370.13, 370.14, 484.4, 581; 257/428, 429; 378/79, 901

(56) References Cited

U.S. PATENT DOCUMENTS

| | | | |
|---|---|---|---|
| 4,618,380 A | * 10/1986 | Alcorn et al. | ................ 148/187 |
| 4,864,140 A | 9/1989 | Rogers et al. | |
| 4,937,453 A | 6/1990 | Nelson | |
| 5,117,144 A | * 5/1992 | Street et al. | ............ 250/370.11 |
| 5,156,810 A | * 10/1992 | Ribi | ........................ 422/82.01 |
| 5,481,115 A | 1/1996 | Hsieh et al. | |
| 5,627,377 A | * 5/1997 | Hamilton, Jr. et al. | .. 250/370.13 |
| 5,665,969 A | 9/1997 | Beusch | |

FOREIGN PATENT DOCUMENTS

EP 0776126 A1 5/1997

OTHER PUBLICATIONS

Marks, D.G. et al., *A 48/spl times/48 CdZnTe Array with Multiplexer Readout*. Nuclear Science, IEEE Transactions on, vol.: 43, Issue : 3, Part: 2, Jun. 1996, pp. 1253–1259.
Marks, D.G. et al., *Maximum–likelihood Estimation for Semiconductor Detector Arrays*. Nuclear Science Symposium, 1997. IEEE, 1997, pp. 551–555, vol. 1.
Yin, S. et al., *A Low–Dose High Constrast Digital Mammography System (DigiMAM)*. Nuclear Science Symposium 1998. Conference Record 1998 IEEE, Nov. 8–14,1998, pp. 1656–1659, vol. 3.

* cited by examiner

Primary Examiner—Constantine Hannaher
Assistant Examiner—Otilia Gabor
(74) Attorney, Agent, or Firm—Howrey, Simon, Arnold & White LLP

(57) ABSTRACT

The present invention relates a method of enhancing contrast information from an x-ray detecting arrangement, when detecting a number of photons in said arrangement comprising at least two adjacently arranged sensors provided on one substrate, each sensor having a corresponding output signal, each of which can be influenced due to shared charge from a photon detected in one of said adjacent sensors, which detected photon indirectly creates an amount of free charges proportional to the photon energy, wherein said influence on said signal is considered by weighting said photon with respect to possible said photon charge-share between said at least two adjacent sensors.

23 Claims, 3 Drawing Sheets

METHOD AND ARRANGEMENT RELATING TO X-RAY IMAGING

CROSS REFERENCE TO RELATED APPLICATIONS

The present application is a continuation of International Application No. PCT/SE00/01954, filed Oct. 9, 2000 and published in English pursuant to PCT Article 21(2), now abandoned, and which claims priority to Swedish Application No. 9903655-0, filed Oct. 8, 1999, and U.S. Provisional Application No. 60/158,465, filed Oct. 8, 1999, now abandoned. The disclosures of all applications are expressly incorporated herein by reference in their entirety.

BACKGROUND OF INVENTION

1. Technical Field

The present invention relates to a method and arrangement of detecting a number of photons in an x-ray detecting arrangement having a number of spaced apart sensors, wherein the detected photons indirectly create an amount of free charges proportional to the photon energy.

2. Background Information

Although the technique of x-ray imaging was discovered a long time ago, imaging systems of today still use the following simple procedure. Photons from a spectrum of energies are passed through an object and then detected. If a massive body such as a tumor is included in this object, a shadow (i.e., fewer photons) will fall on the detector, creating an image. Obviously, stochastic fluctuations occur in the number of photons that pass through the tissues. A sufficient amount of radiation is needed so that these fluctuations are small relative to the difference in the expected number of photons passing through the different tissues.

Preferably, the most efficient use of the detected photons is made so as to minimize the patient dose. Better detectors have been created for this purpose, with less radiation containing information about the object escaping undetected. However, very little attention has been drawn to the possibilities of increasing or improving efficiency by using information about the energy spectrum after the object. Digital systems open up new possibilities concerning this idea.

U.S. Pat. No. 5,665,969 to Beusch ("the '969 patent") describes an x-ray detector, designed to operate as an imaging spectrometer for imaging of a subject. The x-ray detector measures energy of individual x-ray photons in each of a plurality of pixels in the x-ray detector. The pixels of the x-ray detector are readout at a rate such that the likelihood of arrive of more than one x-ray photon in each pixel during a readout period is negligible. Because x-ray photons with different energy levels will create different magnitude responses in the x-ray detector, the measurements made by the x-ray detector can be weighted according to the energy level of the detected x-ray photons. Thus, responses due to noise or x-ray photons which contribute little or no x-ray attenuation information can be discarded or weighted to eliminate or reduce their effect on any resulting image. Conversely, measurements due to x-ray photons which provide significant attenuation information can be weighted significantly.

According to the '969 patent, the optimal energy weighting one should use is the theoretical optimal one, that is approximately proportional to the negative third power of energy. There is nothing mentioned about charge shares and the optimal weight curve which can be used in reality. To be able to weight the photons with respect to the information content in a realistic way for semiconductor detectors, the signal sharing between the detector pixels must be considered. This has not been obvious until now. The '969 patent does not consider this possibility. If charge sharing is used in this case for energy weighting, the resultant image will be deteriorated, especially in case of mammography. The suggested method works for detectors having large pixels, in which charge sharing can be neglected and hence this is not a problem. In case of small detectors with spatial resolution the charge sharing will affect the output signal.

In traditional detectors, the signal is usually integrated for each pixel and each individual photon is not considered. In these types of detectors, normally used in hospitals and x-ray examination of material, the charge sharing between the pixels is positive, which increases the signal quality. It is also inherited in the detector structure which is not considered in signal processing. However, for photon-counting detectors, the signal sharing causes problems.

Examples of detectors, on which the present invention can be applied to, are disclosed in U.S. Pat. No. 4,937,453 to Nelson ("the '453 patent") and Swedish Patent Application No. 9900856-7. The '453 patent discloses a method and apparatus for detecting x-ray radiation in a radiographic imaging context using so-called "edge-on" detectors. It is particularly useful in conjunction with slit and slot scan radiography. In accordance with this invention, detectors are constructed and arranged such that substantially all of the energy from an x-ray to be detected is discharged in the detector. In this way a detector is provided which provides a direct electronic read out, high x-ray stopping power and high spatial resolution while obtaining good signal collection efficiency without the use of excessively high voltage levels. In the preferred embodiment, solid-state x-ray detectors are constructed such that the thickness of the detector along the direction of incident x-rays is long enough that substantially all of the x-ray energy is discharged in the detector.

Swedish Patent Application No. 9900856-7 refers to a method of obtaining improved radiographic images consisting of orienting a semiconductor radiation detector. The orienting step comprises a selection of an acute angel between the direction of incident radiation and a side of the detector such that the incident radiation mainly hits the side.

FIG. 1 is a schematic illustration of a detector 100 comprising a semi-conducting substrate 110 and spatially arranged sensor or electrode strips 120. Common for these detectors is that stripes of sensors are arranged spaced from each other on a silicon substrate and the x-rays incident onto both the sensors and the space between them.

The article Marks, D. G. et al, "A 48×48 *CdZnTe array with multiplexer readout*", Nuclear Science, IEEE Transactions, vol. 43, issue 3, part 2, June 1996, pp. 1253–59, describes charge spreading in an array of pixels in an x-ray detector on a single substrate. A method of summing nearest-neighbor pixels is disclosed. The photons are only weighted with regard to the amount of charge. The photon energy is re-created with respect to a certain level. Energy levels above a threshold value are not weighted.

SUMMARY OF INVENTION

The present invention enhances the prior art methods by means of a simple but yet efficient arrangement. In doing so, the present invention provides a novel method and arrangement for detecting and analyzing x-rays in an efficient and accurate manner.

The present invention also reduces the effects of charge sharing and trapping in a photon charge detector arrangement. The invention detects photon transmissions through a tissue and amplifier the contrast through weighting.

A method is provided for enhancing contrast information from an x-ray detecting arrangement when detecting a number of photons in the arrangement. The method includes providing at least two adjacently arranged sensors on one substrate. Each sensor has a corresponding output signal, each of which can be influenced due to shared charge from a photon detected in one of the adjacent sensors. The detected photon indirectly creates an amount of free charges proportional to the photon energy. The influence on the signal is considered by weighting the photon with respect to possible photon charge-share between the at least two adjacent sensors.

The method further includes the step of disregarding the smaller signal, or adding together two signals when signals from the sensors appear within a small time window on at least two neighboring strips.

The method further includes the step of providing an optimal weighting curve by calculating distributions of charge sharing for each energy bin in a photon spectrum that enters the detector and using an optimal theoretical weight curve for said spectrum. Moreover, for each energy bin of the incoming spectrum, how a large fraction of photons that will be recorded in preferably all different bins in a recorded spectrum is calculated, as well as how many photons that are not counted and the distribution of signals in the neighboring sensor. The method further includes the step of calculating the distribution of real photon energies that belong to a recorded energy bin, wherein the weight belongs to a certain bin being the convolution of said distribution and theoretical weight factors.

In one embodiment a weight curve for trapped photon charges is computed, which further includes a distribution of signals, e.g., through simulation, from each energy bin in the photon spectrum, which also includes trapping, and through backwards calculation, calculating for each bin in a detected pulse amplitude spectrum how the photons that contributed to the bin are distributed in its energy spectrum.

In a preferred embodiment the method further includes the steps of irradiating an object through an x-ray source, detecting the beam having a spatial object information and a spectrum filtered by the object by means of said sensors, wherein the signal from the sensors is a signal deriving from a detected photon, signal from each x-ray detector for each sensor being readout and an amplitude of the signal being compared to a threshold level, generating an output for signals above or below said threshold value as an output for an amount of time, which relates to the time the signal is above or below the threshold levels, and if the signal from an x-ray photon is shared between two sensors and triggers an adjacent comparator, the two comparators outputs generating a simultaneous signal. The method further includes the step of detecting the simultaneous signal and initiating a charge sharing, indicating if the amplitude of a signal is high or low, for indicating if the x-ray photon is high energy or low energy, and counting the number of photons through the indication representing spectrums of signal amplitudes for each image pixel.

A preferred arrangement for detecting and counting photons in an x-ray beam includes a detector arrangement having sensors, and at least to each sensor coupled amplification unit, comparator means, logic unit and counter. Preferably, the counter comprises a first and a second counter for each sensor and the first and second counters correspond to high and low energy photons, respectively. Moreover, the comparator is connected to a threshold value and if the signal exceeds a predetermined threshold level the output of a comparator is a logical signal as output for an amount of time, which relates to the time, the signal exceeds the threshold levels. If the signal from an x-ray photon is shared between two sensors and two adjacent comparators, the signal generated is same at simultaneously. Additionally, simultaneous signals are detected by the logic units and if at least two adjacent comparators have same signals charge sharing is indicated. Moreover, it includes interface means for connection to further processing means.

BRIEF DESCRIPTION OF DRAWINGS

Following, the invention will be further described in a non-limiting way with reference to the accompanying drawings in which.

DETAILED DESCRIPTION

Figure 1:
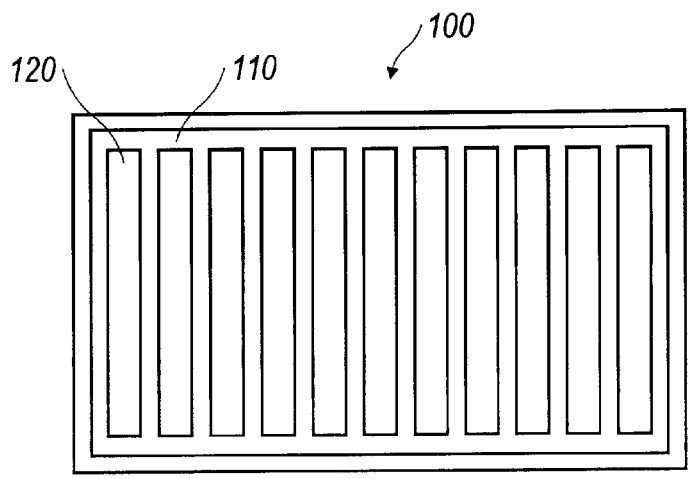
FIG. 1 schematically illustrates a detector arrangement for detecting x-rays.

The difference in absorption probability between the normal tissue and the tumor becomes larger with decreasing photon energy. Therefore, a low energy photon carries more contrast information and should be given a higher statistical weight after detection. Mathematically, it can be shown that the photons should be given statistical weights that are approximately proportional to the negative third power of their energy.

In addition to the examples of detectors disclosed above, a gaseous detector, such as a Parallel Plate Chamber where the gas volume is oriented edge-on to the incident X-rays can be employed.

Imaging systems are normally integrating, that is, the signals created from individual photons in the detector are added together. Since the signals are proportional to the photon energy, the statistical weights differ four powers of the energy from the optimal weighting. In digital photon counting systems, all photons are given unity statistical weights, which is therefore a more efficient way of obtaining information describing the object. The optimal way would be to use a detector with high-energy resolution, and to register the detected spectrum. The energy bins in this spectrum can then be added together in the optimal weighting manner. A simplifying compromise to this method is to record the spectrum into only a few bins. An extreme case of this is to use only two energy bins, each one with an associated weight factor (dual weighting).

In reality, the spectrum that would be registered is not the correct one that is entering the detector. The reason is photons that are detected indirectly create an amount of free charges proportional to the photon energy. These charges are collected on electrodes, with the signal created being proportional to the number of charges collected. This is used in an energy sensitive detector system where the signals are sorted into a spectrum according to their sizes. When a photon is transformed into free charges, those charges flow towards electrodes. Ideally, all free charges of the type that are collected (electrons or holes) are collected at the nearest electrode (sensor) strip, so it contributes in the right image pixel. In general however, an amount of charges will be shared with the strip that is the second nearest to the interaction (charge sharing). Yet, another amount of free charge will become trapped inside the detector volume, and will not reach the electrode in time to contribute to the signal (trapping). The trapping effects are significant between the electrodes (same as charge sharing), which depends on the flow of free charges in an area between the electrodes and immediately under the surface of the electrodes. In the mentioned area the electrical potential drop is affected by the charges in the oxide layer between the electrodes. Consequently, the electrical drop is low and the free charges are slowed down and trapped. However, outside the electrodes the trapping effect is insignificant. Theoretically, it is possible to disregard the trapping, but trapping depends on the electrode geometry, specially the distance between the electrodes exposed to the oxide layer, bias voltage on the detector and manufacturing. The charge sharing occurs in both silicon and gas micro-strip electrodes (and others).

The effects of these two mechanisms are that the photons, in general, will be registered having less energy than they really had, and subsequently, they will be given large statistical weights. The electronic readout has a threshold for discriminating real signals from noise (mainly appearing in the pre-amplifier). This threshold level is well below the least energetic photons in the spectrum entering the detector but, because of the charge losses, some photons give rise to signals below this threshold and are not registered at all. Additionally, charges that are shared will be interpreted as a low energy photon. Moreover, the trapped charges will partly be scattered in time and partly be all too few to be able to pass the threshold. This is of course a drawback, since it is a false photon that will acquire a large weight.

One possible way to reduce these problems is to use anti coincidence when reading out the detector signal, i.e., when signals appear within a small time window on two neighboring strips, the smaller signal is disregarded. Another way would be to add the two signals together, and thereby reconstruct the initial photon energy. It is not possible to fully reconstruct the right spectrum in this way. For example, the charge lost by trapping is not considered. The trapping depends on many factors, such as detector material, material purity, the sensor or electrode width, the space between the sensors, etc.

This distortion of the spectrum suggests that the theoretical optimal weighting calculated before is not optimal in reality. One significant difference is that the lowest end of the spectrum should have low statistical weight instead of highest, since a large fraction derives from false photons (if anti-coincidence is not used).

The optimal weighting curve can be found after calculating the distributions of charge sharing for each energy bin in the photon spectrum that enters the detector. It is desirable to use the optimal theoretical weight curve for this spectrum, although this is not the spectrum that is recorded. For each energy bin of the incoming spectrum, it is calculated how a large fraction of photons that will be recorded in all the different bins in the recorded spectrum, how many photons that were never counted at all (because their signals were reduced below the electronic threshold level), and the distribution of signals in the neighboring strip. Then it is possible to calculate the distribution of real photon energies that belongs to a recorded energy bin. The weight belonging to a certain bin is then the convolution of this distribution and the old theoretical weight factors. The fraction of false photons is given zero weight. The fractions are normalized, so that the sum of fractions in the real spectrum plus the fraction of false photons are considered equal. The fractions of undetected photons with energy corresponding to the considered bin are then added to the convolution after being multiplied with the corresponding weight factor.

Figure 2:
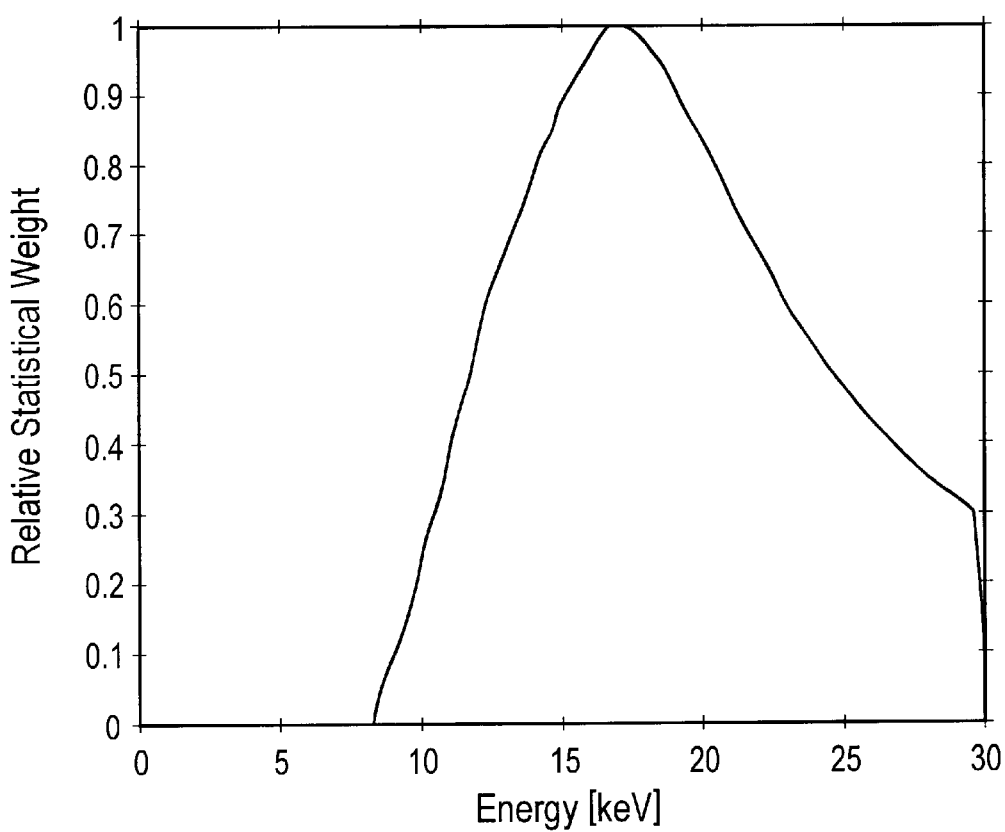
FIG. 2 is an example of a weight curve.

FIG. 2 is an example of an optimal weight curve for a 5 mm tumor when anti-coincidence has not been used to be compared with $E^{-3}$ according to prior art.

Figure 3:
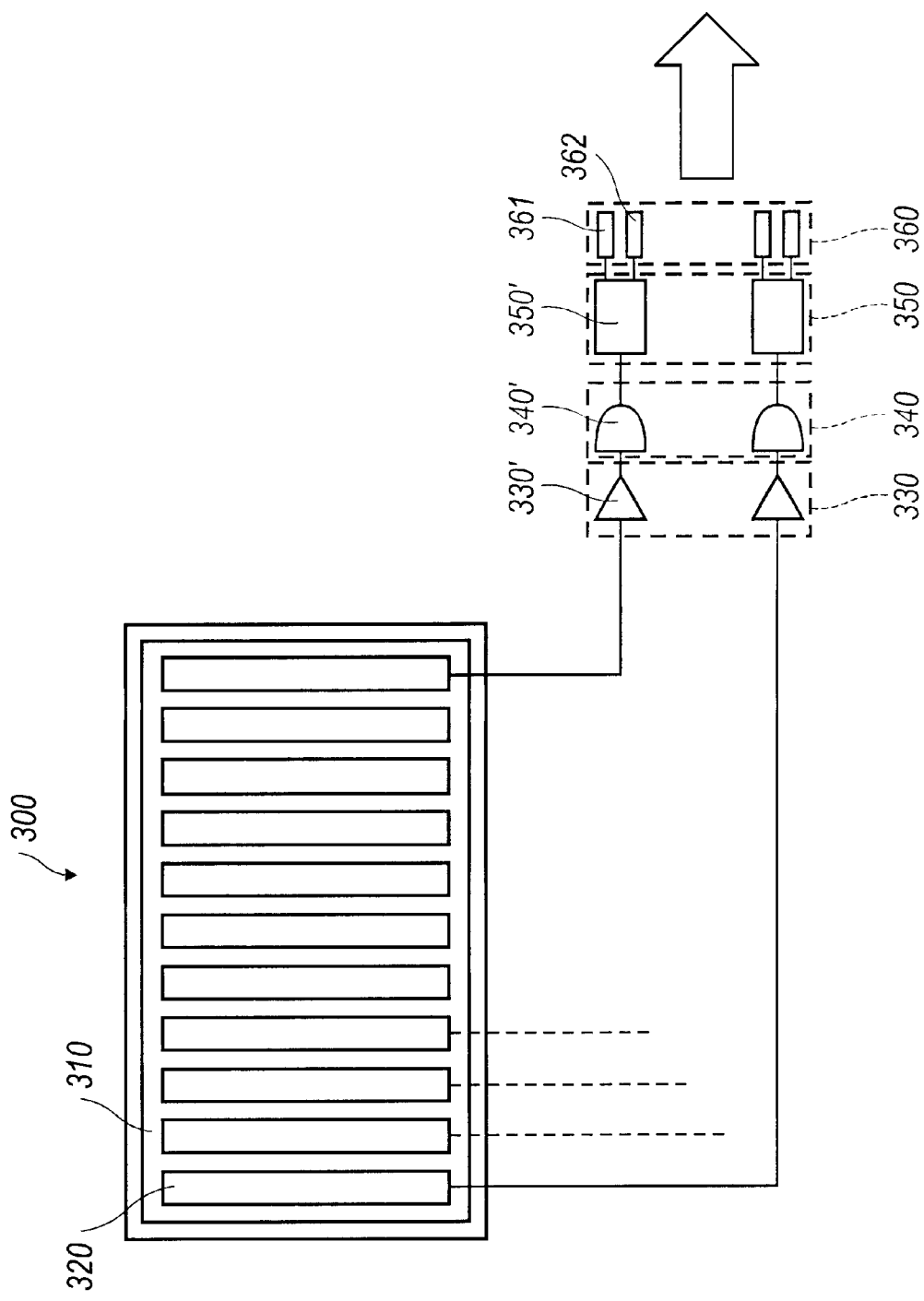
FIG. 3 is a schematic block diagram of a detector arrangement embodiment, according to the present invention.

In a preferred embodiment shown in FIG. 3, an arrangement according to the invention includes a set of detector arrays 300 having sensors 310 that are connected to an amplification block 330, a comparator block 340, a logic block 350 and a counter block 360.

Figure 4:
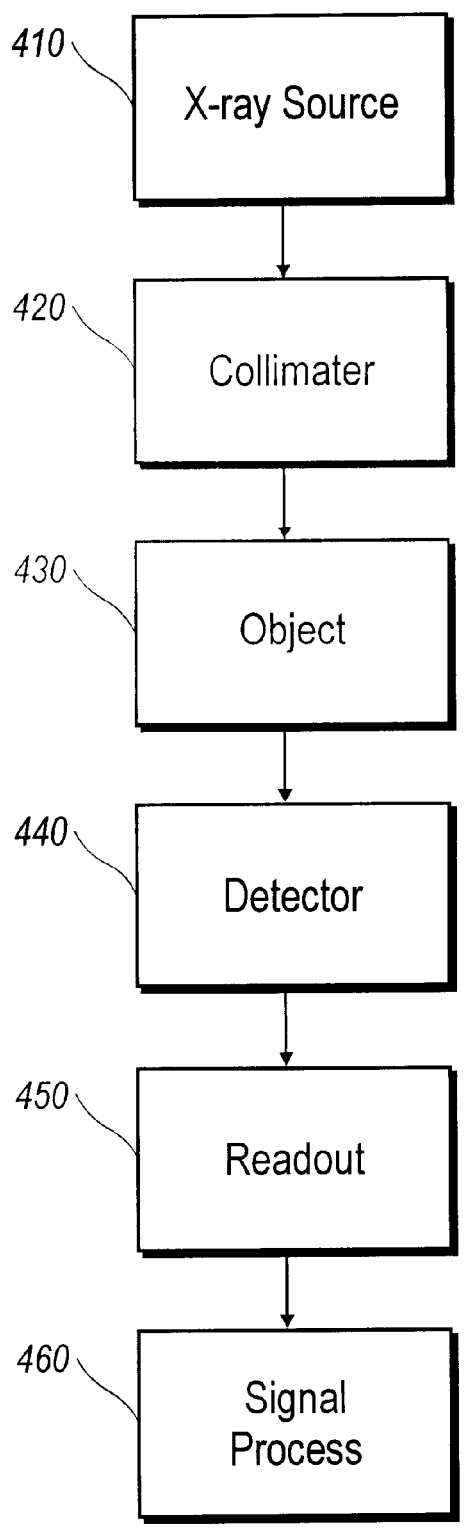
FIG. 4 is a block diagram illustrating the steps of a method according to the present invention.

Referring to the block diagram of FIG. 4, the operative steps according to the present invention in conjunction with FIG. 3 are as follows. An x-ray source 410 irradiates an object. The beam from the x-ray source has a spectrum characteristic of the source. Referring to step 420, the beam is collimated or refracted onto an object to be examined. The beam filtered by the object 430 obtains spatial object information and a spectrum, and incident 440 onto the detectors. The signal from the detectors is a signal deriving from a detected photon. The signal shape depends on the photon energy and conversion position in the detector. One photon can produce signals in more than one channel due to the charge sharing.

The signal from each x-ray detector 300 for each channel, i.e., each sensor 310, is readout 450 by first being amplified by an amplifier 330'. After being amplified, the amplitude of the signal is compared to threshold levels in a comparator 340'. If the signal exceeds a predetermined threshold level, the output of comparators is sat, e.g., by means of a logic one, as an output for an amount of time, which relates to the time the signal exceeds the threshold levels. If the signal from an x-ray photon is shared between two channels and triggers an adjacent comparator, these two comparators then signal ("1") at the same time. To determine a low or high-energy photon, there are preferably two threshold values—a first low value and a second high value. A low energy photon is detected if the signal exceeds the low threshold but not the high threshold. A high-energy photon threshold is detected if both low and high thresholds are exceeded.

The simultaneous signals will be detected by the logic units 350' following the comparators "1", a flag is set for charge sharing. This can be achieved by standard logic such an AND gate for signals from adjacent comparators. Another flag can be set indicating if the amplitude is high or low, i.e., if the x-ray photon is high energy or low energy.

After logic block 350, there are the counters 360. In a simple embodiment there is one counter 361 for high-energy photons and one counter 362 for low energy photons. Alternatively, it is possible to use several counters if more accurate measurement of the energy is desired. Normally, there is not a charge-sharing phenomenon, the flag is not set, and the counter corresponding to the energy of the photon is incremented. If the charge sharing flag is set, only the counter for one channel is updated, which could be any of the two channels. However, it is important that two channels are not incremented at the same time. In this case, only the counter corresponding to the highest photon energy is updated. Because of charge sharing, the energy is not known and the weighting of a high-energy photon as a low energy photon is avoided, as this severely degrades the DQE. Weighting a few low energy photons as high-energy photons is not as severe.

The content of the counters, which are spectrums of signal amplitudes for each image pixel, can then be readout 460, e.g., through a shift register or similar, by a computer for storing data, making energy weighting with optimal weight-function, image processing and presentation. Compensation for charge losses and charge sharing in the detector is included in the optimal weight function.

Obviously, the above described arrangement is given as an example and other arrangements, e.g., including A/D-converters, microprocessors, etc., can occur.

With respect to the trapping, the trapped charges will be handled as the "false" electrons in the charge sharing case, i.e., the share of the trapped charges is counted and this share is weighted zero. However, it is not possible to discriminate the trapped charges using anti-coincidence. As a result of the trapping, the signal from an electrode decreases regardless of whether it is effected by the charge sharing or not.

The weight curve for trapping is computed in same way as above. Firstly, a distribution of signals, e.g., through simulation, from each energy bin in the photon spectrum is computed, which also includes trapping. Then, through backwards calculation, it is calculated for each bin in the detected pulse amplitude spectrum how the photons which contributed to the bin are distributed in its energy spectrum.

New optimal weighting curves are calculated taking into account charge sharing, and achieved efficiency for different weighting methods are determined based on simulations. In the following the results of simulations of 100 and 50 micron pitch detectors are disclosed. Charge sharing is included, but not trapping. The efficiencies are expressed as DQE (Detective Quantum Efficiency). The reference is the signal to noise ratio (SNR) squared in an ideal detector without charge losses and using the theoretical optimal weighting curve. The DQE depends on the object that is imaged, and in the simulations, a 40 mm thick breast with a 5 mm tumor and a 250 micron calcification were modeled. In reality, of course, it is not possible to choose the weighting curve that is optimal for the tissue in a particular pixel. Optimal weight curves are, however, not that different. Preferably, it is best to choose the curve that corresponds to the most difficult tissue (and significant for diagnosing purpose) to detect in an image.

In addition, the DQE depends on the electronic threshold level. The results disclosed below are those for the threshold level that gives the highest DQE, that is, optimal threshold levels have also been determined in this study. A 30 keV tungsten spectrum was used in the simulations. In all weighting methods disclosed in tables 1–3 below, except for the "optimal" case as disclosed in the tables, a signal corresponding to less than 14 keV was weighed as a 14 keV photon. This improves the efficiencies since it is known that no photon below 14 keV passes unabsorbed through the object. The optimal weighting, however, assigns the best individual weights also for these lowest energy bins. The uncertainties in the DQEs stated below are approximately 1%, and the threshold levels are within about 200–300 electrons.

Table 1 discloses DQEs and optimal threshold levels for different weighting methods in the case where no anti-coincidence is used. The results for a detector with 100 micron pitch and 50 micron pitch, respectively, are shown in their respective column. The threshold levels should be multiplied with 3.6/1000 to convert from electrons to keV.

TABLE 1

| Weighting method | DQE for tumor | | DQE for calcification | | Optimal threshold level for tumor (electrons) | | Optimal threshold level for calcification (electrons) | |
|---|---|---|---|---|---|---|---|---|
| micron pitch | 100 | 50 | 100 | 50 | 100 | 50 | 100 | 50 |
| Old theoretical | 0.76 | 0.64 | 0.80 | 0.67 | 4000 | 4000 | 4000 | 4000 |

TABLE 1-continued

| Weighting method | DQE for tumor | | DQE for calcification | | Optimal threshold level for tumor (electrons) | | Optimal threshold level for calcification (electrons) | |
|---|---|---|---|---|---|---|---|---|
| Counting | 0.77 | 0.72 | 0.80 | 0.75 | 2800 | 2800 | 2800 | 2800 |
| Integrating | 0.70 | 0.69 | 0.72 | 0.72 | 2400 | 2000 | 2400 | 2000 |
| Dual weighting | 0.82 | 0.75 | 0.85 | 0.78 | 3200 | 3200 | 3200 | 3200 |
| Optimal | 0.86 | 0.79 | 0.87 | 0.81 | 2400 | 2400 | 2400 | 2400 |

The DQEs dropped from 1 to 0.76 and 0.80 for tumor and calcification respectively when the old theoretical weighting curve was used and charge sharing was introduced. The efficiency becomes worse than for a photon counting system. The two weighting bins have been optimized in the case of dual weighting. If the signal corresponds to energy higher than 22–23 keV, then it should be given a weight that is about 0.61 or about 0.68 for 100 and 50 micron pitch, respectively, in the case of tumor and about 0.64 and about 0.71 in the case of calcification. Otherwise, the weight is unity.

Table 2 shows DQEs and optimal threshold levels for different weighting methods in the case when anti-coincidence is used. The results for a detector with 100 micron pitch and 50 micron pitch, respectively, are shown in separate columns. The threshold levels should be multiplied with 3.6/1000 to convert from electrons to keV.

TABLE 2

| Weighting method | DQE for tumor | | DQE for calcification | | Optimal threshold level for tumour (electrons) | | Optimal threshold level for calcification (electrons) | |
|---|---|---|---|---|---|---|---|---|
| micron pitch | 100 | 50 | 100 | 50 | 100 | 50 | 100 | 50 |
| Old theoretical | 0.79 | 0.8 | 0.84 | 0.82 | 2000 | 2000 | 2000 | 2000 |
| Counting | 0.81 | 0.8 | 0.84 | 0.85 | 2000 | 2000 | 2000 | 2000 |
| Integrating | 0.7 | 0.7 | 0.73 | 0.73 | 2000 | 2000 | 2000 | 2000 |
| Dual weighting | 0.88 | 0.9 | 0.9 | 0.88 | 2000 | 2000 | 2000 | 2000 |
| Optimal | 0.9 | 0.9 | 0.92 | 0.9 | 2000 | 2000 | 2000 | 2000 |

The cut in the spectrum should now be made at about 22–23 keV in case of dual weighting and 100 micron pitch. The higher energy weight factors are about 0.58 and about 0.62. In case of 50 micron pitch, the cut should be at about 21–22 keV and the weight factors about 0.62 and about 0.66. The threshold levels should know be set as low as possible without allowing false counts due to electronic noise. Two thousand electrons were chosen, allowing all photons to be detected, even if charge sharing is 50% (which should be considered correct when trapping is not considered.)

Table 3 includes DQEs and optimal threshold levels for different weighting methods where coincident signals on two neighboring strips are added. The results for a detector with 100 and 50 micron pitches, respectively, are in separate columns. The threshold levels should be multiplied with 3.6/1000 to convert from electrons to keV.

TABLE 3

| Weighting method | DQE for tumor | | DQE for calcification | | Optimal threshold level for tumor (electrons) | | Optimal threshold level for calcification (electrons) | |
|---|---|---|---|---|---|---|---|---|
| micron pitch | 100 | 50 | 100 | 50 | 100 | 50 | 100 | 50 |
| Old theoretical | 0.92 | 0.91 | 0.94 | 0.9 | 2000 | 2000 | 2000 | 2000 |
| Counting | 0.81 | 0.82 | 0.85 | 0.8 | 2000 | 2000 | 2000 | 2000 |
| Integrating | 0.69 | 0.7 | 0.74 | 0.7 | 2000 | 2000 | 2000 | 2000 |
| Dual weighting | 0.9 | 0.89 | 0.93 | 0.9 | 2000 | 2000 | 2000 | 2000 |
| Optimal | 0.94 | 0.94 | 0.95 | 0.9 | 2000 | 2000 | 2000 | 2000 |

The cut in the spectrum should now be made at about 21–22 keV (100 micron pitch) and about 18–19 keV and about 19–20 keV (50 micron, tumor and micro-calcification respectively) in case of dual weighting. The higher energy weight factors are about 0.57 and about 0.61 for 100 micron pitch, and about 0.60 and about 0.65 for 50 micron pitch. Again, the threshold levels should be set as low as possible. Accidental coincidence of independent photons has not been considered.

The reason why the optimal weighting is still a few percent better than the old theoretical is that the optimal method compensates for the fact that photons only detected on one strip in general creates lower signal than corresponds to its energy.

The invention is not limited the shown embodiments but can be varied in a number of ways without departing from the scope of the appended claims and the arrangement and the method can be implemented in various ways depending on application, functional units, needs and requirements etc.

What is claimed is:

1. A method of enhancing contrast information from an x-ray detecting arrangement when detecting a number of photons in said arrangement, the method comprising the steps of:
   providing at least two adjacently arranged sensors on one substrate, each sensor having a corresponding output signal, each of which can be influenced due to shared charge from a photon detected in one of said adjacent sensors,
   which detected photon indirectly creates an amount of free charges proportional to the photon energy,
   wherein said influence on said signal is considered by weighting said photon with respect to possible said photon charge-share between said at least two adjacent sensors.

2. The method according to claim 1, further comprising the step of comparing said output signals from said sensors and disregarding one of signals being lower than the other signal, said signals appearing within a small time window.

3. The method according to claim 1, further comprising the step of adding said signals when said signals appear within a small time window.

4. The method according to claim 1, further comprising the step of providing a weighting curve by calculating distributions charge shares for one or more energy bins in a photon spectrum entering said detecting arrangement.

5. The method according to claim 4, further comprising the step of using a theoretical weight curve for said spectrum.

6. The method according to claim 5, further comprising the steps of, for each energy bin of said spectrum:
   calculating an amount of photons to be recorded in all different bins in a recorded spectrum,
   calculating an amount of photons that are not counted, and
   calculating a distribution of signals in an adjacent sensor.

7. The method according to claim 6, further comprising the step of calculating a distribution of real photon energies belonging to a recorded energy bin.

8. The method according to claim 7, wherein a weight belonging to a certain bin is a convolution of said distribution and theoretical weight factors.

9. The method according to claim 5, further comprising the step of computing said weight curve for trapped photon charges.

10. The method according to claim 9, further comprising the steps of:
    computing a distribution of signals through simulation, from each energy bin in the photon spectrum, which also includes trapping, and
    through backwards calculation, calculating for each bin in a detected pulse amplitude spectrum how the photons, which contributed to the bin are distributed in their energy spectrum.

11. The method according to claim 1, further comprising the steps of:
    irradiating an object by means of an x-ray source,
    detecting a beam having a spatial object information and a spectrum filtered by the object by means of said sensors, the signals from the sensors being signals deriving from a detected photon,
    collecting a signal from an x-ray detector for each sensor and comparing an amplitude of the signal with a threshold level,
    generating an output for signals over or below said threshold value as an output for a time period relating to a time the signal is over or below said threshold level, and
    generating a simultaneous signal by comparators when said signal from an x-ray photon is shared between two sensors, thereby triggering an adjacent comparator.

12. The method according to claim 11, further comprising the steps of detecting said simultaneous signal and initiating a charge sharing.

13. The method according to claim 11, further comprising the step of indicating the amplitude of a signal high or low, representative of high energy or low energy of the photon.

14. The method according to claim 13, further comprising the step of counting the number of photons through said indication, representing spectrums of signal amplitudes for each image pixel.

15. The method according to claim 13, further comprising the step of setting a charge sharing flag whereby only a counter for one signal is updated, said counter corresponding to a highest photon energy being updated, for avoiding weighting a high energy photon as a low energy photon.

16. An x-ray detector arrangement having a device for enhancing contrast information when detecting a number of photons in said x-ray detector arrangement, the arrangement comprising:
    at least two adjacently arranged sensors provided on one substrate, each sensor having a corresponding output signal, each of which can be influenced due to shared charge from a photon detected in one of said adjacent sensors, which detected photon indirectly creates an amount of free charges proportional to the photon energy,
    wherein said influence on said signal is considered by weighting said photon with respect to possible said photon charge-share between said at least two adjacent sensors, said device further comprising an amplification unit connected to at least each sensor, comparator means, a logic unit and a counter.

17. The arrangement according to claim 16, wherein said counter further comprises a first counter and a second counter for each sensor.

18. The arrangement according to claim 17, wherein said first and second counters correspond to high and low energy photons, respectively.

19. The arrangement according to claim 16, wherein said comparator is provided with a threshold value.

20. The arrangement according to claim 19, wherein said comparator is arranged to output a signal if the sensor signal exceeds a predetermined threshold level, said comparator output signal being a logical signal for a time period corresponding to a time the sensor signal exceeds the threshold level.

21. The arrangement according to claim 20, wherein when a signal from an x-ray photon is shared between two sensors and two adjacent comparators, the generated signals are equal simultaneously.

22. The arrangement according to claim 21, wherein said generated simultaneous signals are detected by said logic unit, and wherein when at least two adjacent comparators have equal signals, a charge sharing is indicated.

23. The arrangement according to claim 16, further comprising interface means for connecting to additional processing means.

\* \* \* \* \*